(12) United States Patent
Thorpe

(10) Patent No.: US 10,034,068 B2
(45) Date of Patent: Jul. 24, 2018

(54) TECHNIQUES FOR PULSE SOURCE DETECTION

(71) Applicant: LANDIS+GYR INNOVATIONS, INC., Alpharetta, GA (US)

(72) Inventor: John Thorpe, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 3 days.

(21) Appl. No.: 15/263,422

(22) Filed: Sep. 13, 2016

(65) Prior Publication Data

US 2018/0077474 A1    Mar. 15, 2018

(51) Int. Cl.
*H04Q 9/14*    (2006.01)

(52) U.S. Cl.
CPC .......... *H04Q 9/14* (2013.01); *H04Q 2209/30* (2013.01); *H04Q 2209/60* (2013.01)

(58) Field of Classification Search
None
See application file for complete search history.

(56) References Cited

U.S. PATENT DOCUMENTS

| | | | | |
|---|---|---|---|---|
| 6,112,158 A * | 8/2000 | Bond | ..................... | G06Q 50/06 324/107 |
| 2007/0233323 A1 * | 10/2007 | Wiemeyer | .............. | G05B 15/02 700/276 |
| 2011/0291678 A1 * | 12/2011 | Pflum | ................... | G01F 15/063 324/705 |
| 2012/0169512 A1 * | 7/2012 | Carpman | .................. | G01F 1/60 340/870.16 |
| 2013/0285833 A1 * | 10/2013 | Oswalt | ................... | G08C 19/16 340/870.02 |

* cited by examiner

*Primary Examiner* — Muhammad N Edun
*Assistant Examiner* — Jerold Murphy
(74) *Attorney, Agent, or Firm* — Kilpatrick Townsend & Stockton LLP

(57) ABSTRACT

Disclosed are various systems and methods related to detecting a type of pulse source that is removably attached to a computing device via a data line. The computing device receives two or more pulses from a pulse source via the data line. Based upon the number of pulses received on each input, the computing device can determine the type of pulse source to which it is attached. The computing device further determines an adjustment to the consumption counter based on the identified type of pulse source and the number of received pulses.

20 Claims, 5 Drawing Sheets

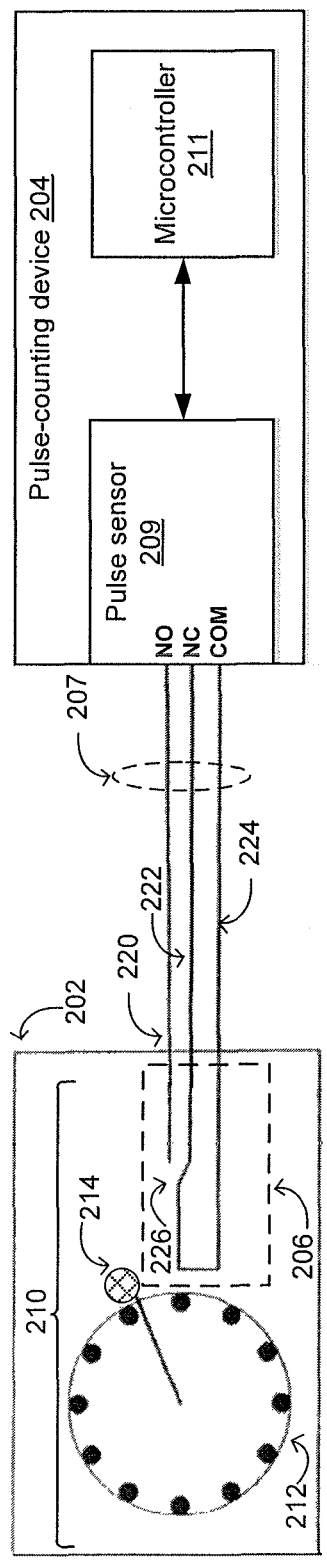
FIG. 2
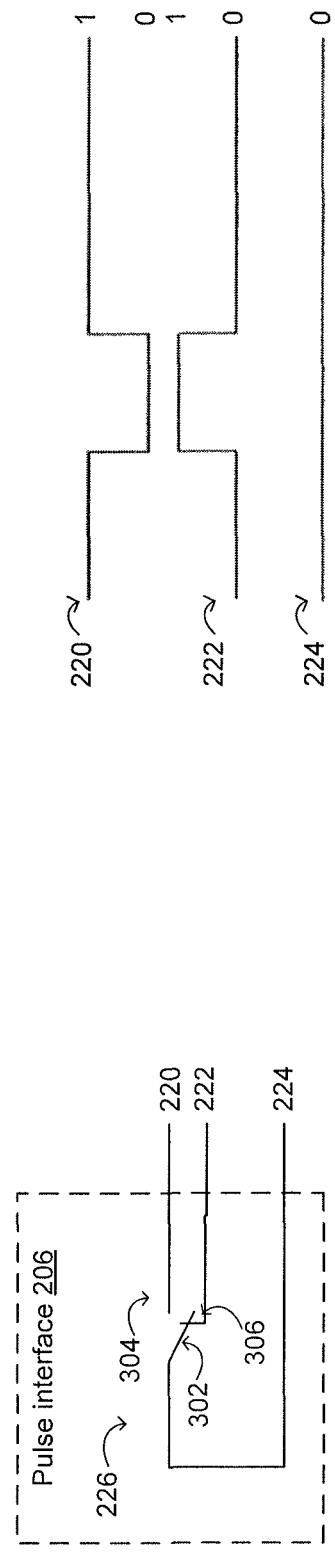
FIG. 4
FIG. 3

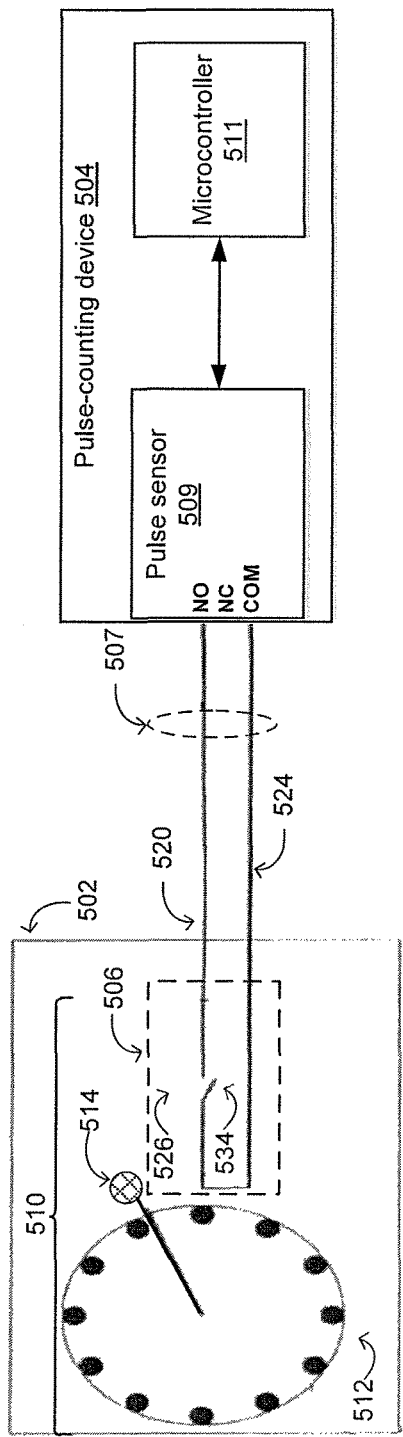
FIG. 5
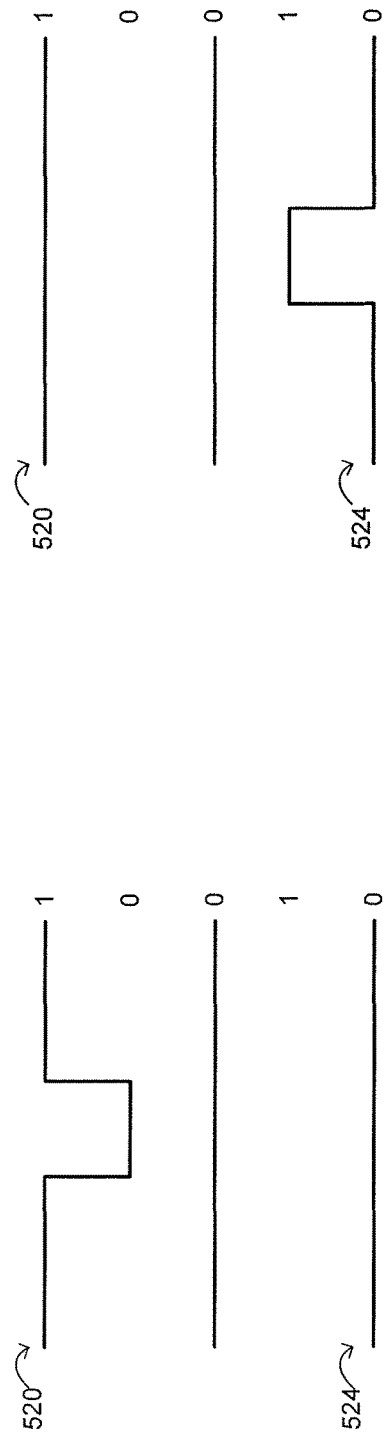
FIG. 7
FIG. 6

TECHNIQUES FOR PULSE SOURCE DETECTION

BACKGROUND

Metering devices are used to measure consumption of resources. Examples of metering devices include electricity meters, water meters, gas meters, steam meters, electronic volume correctors, etc. (generally referred to as "utility meters"). A metering device may communicate consumption of a given resource through a pulse source communicating with a pulse-counting device.

The pulse source may be in a location that is remote from the pulse-counting device, whereby the pulse source is connected to the pulse-counting device via a data cable having one or more wires. Different types of the pulse source are possible that transmit pulses representing units of consumption differently. In order for the pulse-counting device to accurately count units of consumption, the pulse-counting device needs to be configured according to the type of pulse source to which it is connected in order to accurately interpret the pulses. For example, one type of pulse source may indicate one unit of consumption with one pulse, while another type of pulse source may indicate one unit of consumption with two pulses.

Once installed, the pulse-counting device can receive a configuration (e.g., via the radio transceiver) specifying the type of attached pulse source, but the configuration may be received after a substantial period of time has elapsed following installation. During the time between installation and receiving a configuration, any resource consumption indicated by the pulse source may not be correctly counted by the pulse-counting device. Thus, it is desirable to have a pulse-counting device that is capable of counting resource consumption that occurs prior to receiving a configuration specifying the type of attached pulse source.

SUMMARY

Various aspects of the present invention relate to detecting a type of pulse source, such as a utility meter, that is removably attached to a computing device via a data line. To this end, the computing device receives a pulse from a utility meter via a data line attached to the computing device. In response to receiving the pulse on a first input, the computing device increments a first counter corresponding to the first input. A subsequent pulse is received from the utility meter, where the subsequent pulse is received by the computing device on either the first input or a second input.

When the subsequent pulse is received on the first input, the computing device: (i) increments the first counter corresponding to the first input, (ii) determines that the utility meter attached to the computing device uses a first type of switch, and (iii) increments a consumption counter to record that two units have been consumed.

When the subsequent pulse is received on the second input, the computing device: (i) increments the second counter corresponding to the second input, (ii) determines that the utility meter attached to the computing device uses a second type of switch, and (iii) increments the consumption counter to record that one unit has been consumed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a block diagram of a pulse source having a three-wire pulse interface connected to a pulse-counting device via a data cable.

FIG. 3 is a schematic diagram of a pulse interface having a single pole, double throw switch connecting to three interface wires.

FIG. 4 is a graph of voltage levels corresponding to logical states on the wires of a three-wire pulse interface.

FIG. 5 is a block diagram of a pulse source having a two-wire pulse interface in a normally open state connected to a pulse-counting device via a data cable.

FIG. 6 is a graph of normal operation of a device having a two-wire pulse interface in which a voltage bias causes a low voltage level on a normally open wire of the two-wire pulse interface during a pulse.

FIG. 7 is a graph of normal operation of a device having a two-wire pulse interface in which a voltage bias causes a high voltage level on a common wire of the two-wire pulse interface during a pulse.

DETAILED DESCRIPTION

Figure 1:
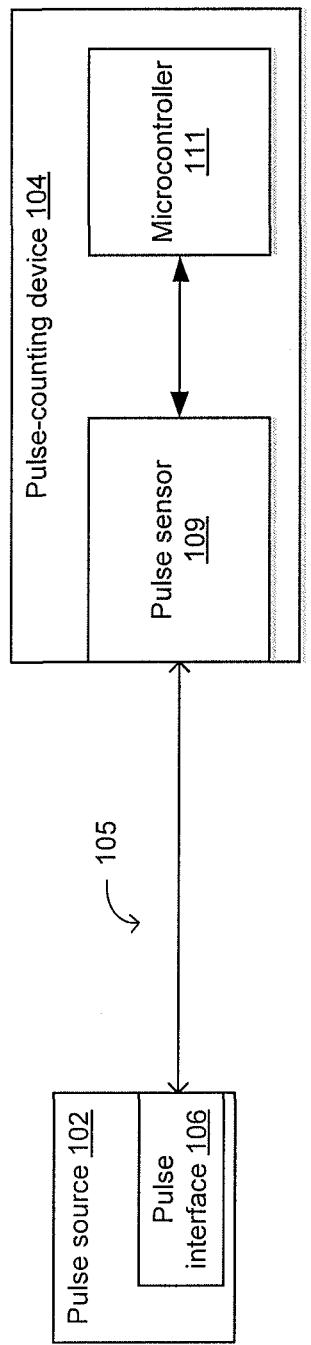
FIG. 1 is a block diagram of a pulse source communicating with a pulse-counting device via a data cable.

Systems and methods are provided for detecting the type of pulse source device attached to a pulse-counting device, then counting the resource usage based on interpreting pulses received from the detected type of pulse source device. As shown in FIG. 1, a pulse source 102 is attached to a pulse-counting device 104 via a data cable 105. The pulse source 102 can be a resource metering device, such as a utility meter, or any other device that produces pulses to indicate volume, consumption, events, and/or alarms. The pulse source 102 can include a pulse interface 106 configured to communicate a given unit of consumption by communicating one or more pulses corresponding to the given unit of consumption.

The pulse-counting device 104 may be any computing device or other electronic device configured to count or otherwise accumulate pulses received from the pulse-source 102. The accumulated pulses indicate total resource consumption. The pulse-counting device 104 may store counts and alarm events to be periodically read from the device. The pulse-counting device 104 may include a pulse sensor 109 that receives pulses via one or more inputs. In some implementations, the pulse sensor 109 is representative of a plurality of sensors where, for example, a sensor may be used for an individual input. Upon receiving a pulse, the pulse sensor 109 notifies the microcontroller 111 of the pulse and the input on which it was received. Among other tasks, the microcontroller 111 may maintain a count of the resource consumption and the pulses received on the various inputs of the pulse-counting device 104. The pulse-counting device 104 may be included in a system, such as an automated meter reading (AMR) system, that includes a radio transceiver (not shown) for communicating data between an administrative server and/or other devices.

Various types of pulse sources exist that use different pulse interfaces with different pulse signaling to indicate resource consumption. For example, one type may indicate one unit of resource consumption using one pulse, while another type indicates one unit of resource consumption using two pulses. Typically, the pulse-counting device 104 receives a configuration identifying the type of pulse source 102 to which it is attached in order to interpret the pulses into units of resource consumption. However, using techniques disclosed herein, the pulse-counting device 104 can detect the type of pulse source 102 to which it is attached via the data cable 105 based on the pulses received. Among other benefits, this permits the pulse-counting device 104 to begin counting resource consumption at the time of installation rather than waiting until a configuration is received at a later time.

For example, as shown in FIG. 2, one type of pulse source device 202 includes a pulse interface 206 that uses a three-wire interface to connect to a pulse-counting device 204 via a data cable 207. The pulse-producing circuit 210 includes the pulse interface 206 and a rotating dial pointer 212 attached to a magnet 214.

The pulse interface 206 can include a normally open (NO) wire 220, a normally closed (NC) wire 222, and a common (COM) wire 224. The normally open wire 220, the normally closed wire 222, and the common wire 224 can be connected to the pulse sensor 209 of the pulse-counting device 204 via a cable 207 having three wires (also referred to as "data lines").

The pulse interface 206 can include a single-pole, double throw ("SPDT") switch 226. Non-limiting examples of the SPDT switch 226 include a Form C magnetic reed switch or Hall effect device. The diagram of FIG. 3 depicts the pulse interface 206 including the SPDT switch 226. The SPDT switch 226 can include an armature 302, a normally open contact 304, and a normally closed contact 306. The rotating dial pointer 212 can be rotated to generate a pulse.

Rotating the rotating dial pointer 212 can bring the magnet 214 attached to the rotating dial pointer 212 in proximity to the pulse interface 206. The pulse interface 206 can change state in response to the magnet 214 being positioned in proximity to the SPDT switch 226. The pulse interface 206 changing state includes the armature 302 being switched between the normally open contact 304 and the normally closed contact 306. The three-wire pulse interface 206 communicates change in state to the pulse-counting device 204 via the cable 207.

The graph in FIG. 4 depicts voltage levels on the wires 220, 222, 224 of the three-wire pulse interface 206. The magnet 214 being distant from the SPDT switch 226 can cause the armature 302 to be connected to the normally closed contact 306 and the normally open wire 220 to be disconnected from the common wire 224. The normally open wire 220 being disconnected from the common wire 224 can cause the voltage on the normally open wire 220 to be low (i.e., the "0" state) and the voltage on the normally closed wire 222 to be high (i.e., the "1" state). Rotating the rotating dial pointer 212 can bring the magnet 214 in proximity to the SPDT switch 226. The magnet 214 being near the SPDT switch 226 can cause the armature 302 to be connected to the normally open contact 304 and the normally open wire 220 to be connected to the common wire 224. The normally open wire 220 being connected to the common wire 224 can cause the voltage on the normally open wire 220 to be high (i.e., the "1" state) the voltage on the normally closed wire 222 to be low (i.e., the "0" state).

In a SPDT switch 226 (such as a Form C switch), respective voltages at the normally open contact 304 and normally closed contact 306 of the SPDT switch 226 are in opposite states. As a consequence of one unit of resource usage, the rotating dial pointer 212 makes one rotation causing the normally open wire 220 and the normally closed wire 222 to each transition, albeit at different times, from a low state to a high state (and vice-versa). The pulse sensor 209 detects and reports these pulses, as well as the wire on which the pulse was detected, to the microcontroller 211. For example, when the voltage on the normally open wire 220 transitions from the low to the high state, the pulse sensor 209 notifies the microcontroller 211 that a pulse has occurred on the input for the normally open wire (also referred to as the "NO" input). Similarly, when the voltage on the normally closed wire 222 transitions from the low to the high state, the pulse sensor 209 notifies the microcontroller 211 that a pulse has occurred on the input for the normally closed wire (also referred to as the "NC" input).

The microcontroller 211 stores a count of the pulses received on each of the NO and NC inputs. The microcontroller 211 is further configured determine the type of pulse interface 206 used by the pulse source 202 based on recognizing the characteristic sequence of pulses received via the NO and NC inputs. For example, the microcontroller 211 can be configured to recognize that receiving a pulse via the NO input, followed next by a pulse received via the NC input, is a unique characteristic of a type of pulse source using a SPDT switch (i.e., a Form C switch), though in some implementations the order may be reversed. The type of pulse source 202 determines how the pulse-counting device 204 should interpret received pulses to adjust the consumption counter. As described previously, in a Form C switch such as the pulse source 202, one full rotation of the rotating dial pointer 212 indicates one unit of consumption and produces two pulses—one on the NO wire 220 and one on the NC wire 222. Thus, in this example, the microcontroller 211 determines that a Form C switch that produced one pulse on the NO input and one pulse on the NC input, should result in the consumption counter being incremented by one. Thereafter, the microcontroller 211 may continue to increment the consumption counter by one each time that the specific pair of pulses—one NO pulse and one NC pulse—is received.

At a later time, the pulse-counting device 204 may receive a configuration, such as can be received via a wireless network from an administrative server. Among other information, the configuration for the pulse-counting device 204 can include a specification of the type pulse source device 202 to which it is attached. In the event that the specification of the type of pulse source device 202 from the configuration differs from the type of pulse source device detected by the pulse-counting device 204, the pulse counting device may raise an exception that indicates the discrepancy. The exception can be stored in the pulse-counting device 204 and/or reported to an administrative server.

In some implementations, when a pulse-counting device is started (e.g., powered-on), it may check the value of a predefined plug-and-play (PnP) flag to determine if the type of attached pulse source device has been identified. For example, a pulse-counting device may, by default, assume a pulse source device is a Form C type and only initiate detecting the type if the PnP flag indicates that the type of pulse source device has not been detected. Thus, following a determination of the type of pulse source device attached to a given pulse-counting device, the pulse-counting device may set a value of a PnP flag that indicates that the type of pulse source device has been identified.

In various implementations, the pulse-counting device 204 includes a de-bounce circuit (not shown) that distinguishes voltage changes on a data line (e.g., the normally open wire 220) that should represent a pulse from electrical noise that should not represent a pulse. To this end, the de-bounce circuit may use a voltage threshold that specifies a minimum received voltage and/or minimum duration of the received voltage that will be identified as a pulse. Within the different types of switches available (e.g., Form A or Form C), different sub-types are available representing different switch constructions, such as mechanical switches or solid-state switches. The different switch constructions can also exhibit identifiable characteristics. For example, mechanical switches, such as a mechanical Form C switch, may produce diminished voltage pulse "echoes" subsequent to switching to produce a pulse, whereas solid-state switches, such as a solid-state Form C switch, do not exhibit this characteristic. As a result, the microcontroller 211 can uses these characteristics to identify the sub-type of switch, such as whether the switch is mechanical or solid-state. The identification can be stored in the pulse-counting device 204 and/or reported to an administrative server.

Moving on, as shown in FIG. 5, another type of pulse source device 502 includes a pulse interface 506 that uses a two-wire interface to connect to a pulse-counting device 504 via a data cable 507. The pulse-producing circuit 510 includes the pulse interface 506 and a rotating dial pointer 512 attached to a magnet 514.

The pulse interface 506 can include a normally open (NO) wire 520 and a common (COM) wire 524. The normally open wire 520, the common wire 524, and possibly other wires can be connected to the pulse sensor 509 of the pulse-counting device 504 via a cable 507 having at least two wires (also referred to as "data lines").

The pulse interface 506 can include a single pole, single throw ("SPST") switch 526 having an armature 534 in a normally open state. The SPST switch 526 can include any switching device that remains in an open state in the absence of a magnetic field, such as a Form A magnetic reed switch. A pulse can be generated by the opening and closing of the armature 534 of the SPST switch 526. Rotating the rotating dial pointer 512, such as occurs when metered resources are being consumed, changes the proximity of the magnet 514 to the pulse interface 506. When the magnet 514 is distant from the SPST switch 526, this causes the armature 534 to open. Alternatively, when the magnet 514 is in proximity to the SPST switch 526, this cause causes the armature 534 to close.

The two-wire pulse interface 506 communicates the state of the SPST switch 526 to the pulse-counting device 504. The pulse-counting device 504 can provide a voltage bias across the wires 520, 524. Closing the SPST switch 526 causes a short between the wires 520, 524. In some aspects, normal operation can include the pulse-counting device 504 providing a voltage bias that causes the voltage on the normally open wire 520 to be set to a low voltage level in response to the SPST switch 526 being closed, as depicted in the graph of FIG. 6. In some aspects, normal operation can include the pulse-counting device 504 providing a voltage bias that causes the voltage on the common wire 524 to be set to a high voltage level in response to the SPST switch 526 being closed, as depicted in the graph of FIG. 7.

As a consequence of one unit of resource usage with the SPST switch 526 (a Form A switch), the rotating dial pointer 512 makes one rotation causing the normally open wire 520 as in FIG. 6 (or the common wire 524 as in FIG. 7) to transition from a low state to a high state. The pulse sensor 509 detects and reports these pulses, as well as the input for the wire on which the pulse was detected, to the microcontroller 511. For example, when the voltage on the normally open wire 520 transitions from the low to the high state, the pulse sensor 509 notifies the microcontroller 511 that a pulse has occurred on the input for the normally open wire (also referred to as the "NO" input). Similarly, if the voltage on the common wire 524 transitions from the low to the high state, the pulse sensor 509 notifies the microcontroller 511 that a pulse has occurred on the input for the common wire 524 (also referred to as the "COM" input).

The microcontroller 511 can store a count of the pulses received on each of the NO and COM inputs. The microcontroller 511 is further configured determine the type of pulse interface 506 used by the pulse source 502 based on recognizing the characteristic sequence of pulses received via the inputs. For example, the microcontroller 511 can be configured to recognize that receiving a pulse via the NO input (or the COM input), followed next by another pulse received via the same input, is a unique characteristic of a type of pulse source using a SPST switch (i.e., a Form A switch). The type of pulse source 502 determines how the pulse-counting device 504 should interpret received pulses to adjust the consumption counter. As described previously, in a Form A switch such as in the pulse source 502, one full rotation of the rotating dial pointer 512 indicates one unit of consumption and produces one pulse. Thus, in this example, the microcontroller 511 determines that a Form A switch that produced two pulses should result in the consumption counter being incremented by two. Thereafter, the microcontroller 511 may continue to increment the consumption counter by one each time that a pulse is received.

At a later time, the pulse-counting device 504 may receive a configuration, such as can be received via a wireless network from an administrative server. Among other information, the configuration for the pulse-counting device 504 can include a specification of the type of pulse source device 502 to which it is attached. In the event that the specification of the type of pulse source device 502 from the configuration differs from the type of pulse source device detected by the pulse-counting device 504, the pulse counting device may raise an exception that indicates the discrepancy. The exception can be stored in the pulse-counting device 504 and/or reported to an administrative server.

In some implementations, when a pulse-counting device is started (e.g., powered-on), it may check the value of a predefined flag (a PnP flag) to determine if the type of attached pulse source device has been identified. For example, a pulse-counting device may, by default, assume a pulse source device is a particular type (e.g., Form A or Form C) and only initiate detecting the type if the PnP flag indicates that the type of pulse source device has not been detected. Thus, following a determination of the type of pulse source device attached to a given pulse-counting device, the pulse-counting device may set a value of a PnP flag that indicates that the type of pulse source device has been identified.

In various implementations, the pulse-counting device 504 includes a de-bounce circuit (not shown) that distinguishes voltage changes on a data line (e.g., the normally open wire 520) that should represent a pulse from electrical noise that should not represent a pulse. To this end, the de-bounce circuit may use a voltage threshold that specifies a minimum received voltage and/or minimum duration of the received voltage that will be identified as a pulse. Within the different types of switches available (e.g., Form A or Form C), different sub-types are available representing different switch constructions, such as mechanical switches or solid-state switches. The different switch constructions can also exhibit identifiable characteristics. For example, mechanical switches, such as a mechanical Form A switch, may produce diminished voltage pulse "echoes" subsequent to switching to produce a pulse, whereas solid-state switches, such as a solid-state Form A switch, do not exhibit this characteristic. As a result, the microcontroller 511 can uses these characteristics to identify the sub-type of switch, such as whether the switch is mechanical or solid-state. The identification can be stored in the pulse-counting device 504 and/or reported to an administrative server.

Figure 8:
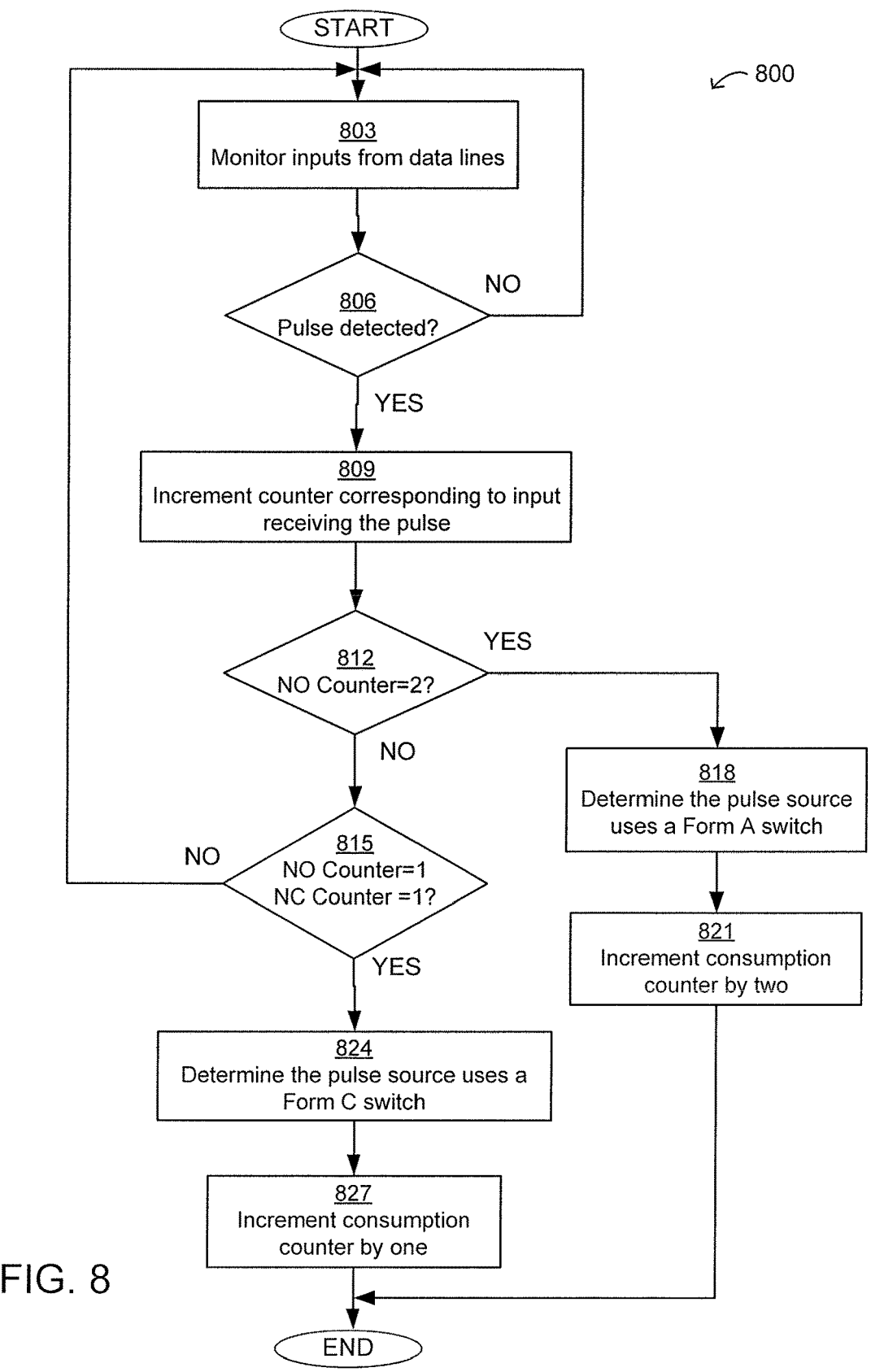
FIG. 8 is a flowchart illustrating one example of pulse source detection functionality implemented in a computing device according to various aspects of the present disclosure.

Referring next to FIG. 8, shown is a flowchart that provides one example of a portion of the pulse source detection operations implemented in a computing device according to various embodiments. It is understood that the flowchart of FIG. 8 provides merely an example of the many different types of functional arrangements that may be employed to implement the portion of the pulse source detection operations as described herein. As an alternative, the flowchart of FIG. 8 may be viewed as depicting an example of elements of a method 800 implemented in a computing device, such as a pulse-counting device, according to one or more embodiments. The operations depicted in the flowchart of FIG. 8 may be initiated in response to the pulse-counting device beginning a startup sequence without having previously detected the type of pulse-source device, the state for which may be indicated with a PnP flag.

Beginning with block 803, a computing device, such as a pulse-counting device, monitors inputs from the data lines of a data cable connected to a pulse source device. For example, when the voltage on a normally open data line (also referred to as a "wire") transitions from the low to the high state (or instead high to low), one or more components of the pulse-counting device detect the pulse.

Next, in block 806, the pulse-counting device determines whether a pulse has occurred on an input, such as on the NO or NC inputs. In various implementations, the pulse-counting device includes a de-bounce circuit that is capable of distinguishing voltage changes received on an input that should represent a pulse from electrical noise that should not represent a pulse. If no valid electrical pulse was detected, execution of the method 800 returns to block 803. Alternatively, if a valid pulse was detected, in block 809, the pulse-counting device increments a counter corresponding to the input on which the pulse was received, where the pulse-counting device stores a count of the pulses received on each of the NO and NC inputs.

Then, in block 812, the pulse-counting device determines whether the NO counter has a value of two (presuming the counters were initially zero). If the NO counter is not two, then execution of the method 800 proceeds to block 815. Alternatively, if the value of the NO counter is two, then a sequence of counter adjustments have occurred that characteristically identify the pulse source device as a type having a Form A switch. Thus, in block 818, the pulse-counting device determines that the pulse source device has Form A switch and, in some implementations, may clear the PnP flag that indicates that the pulse source device has been identified. Next, in block 821, the pulse-counting device increments the consumption counter by two, since Form A switches indicate one unit of consumption for each pulse sent (and two pulses have been received as indicated by the NO counter value).

Returning to block 815 when the NO counter did not equal two, the pulse counting device determines whether the NO counter and NC counter each have a value of one. If not, execution of the method 800 returns to block 803. Alternatively, if the NO counter and NC counter each have a value of one, then a sequence of counter adjustments have occurred that characteristically identify the pulse source device as a type having a Form C switch. Thus, in block 824, the pulse-counting device determines that the pulse source device has Form C switch and, in some implementations, may clear the PnP flag that indicates that the pulse source device has been identified. Next, in block 827, the pulse-counting device increments the consumption counter by one, since Form C switches indicate one unit of consumption for each pair of pulses sent—one on the NO input and one on the NC input. Thereafter, this portion of the execution of the method 800 ends as shown.

Figure 9:
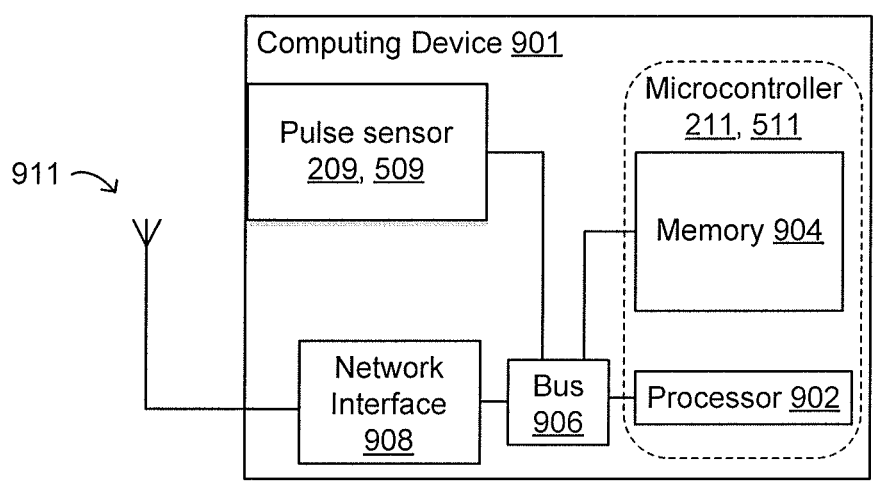
FIG. 9 is a block diagram that provides an example illustration of a computing device that implements the pulse source detection functionality according to various aspects of the present disclosure.

Next, in FIG. 9, shown is another block diagram depicting an example of a computing device 901, such as a pulse-counting device 204, 504, used for implementing the techniques disclosed herein. The computing device 901 can include a processing device 902. Non-limiting examples of the processing device 902 include a microprocessor, an application-specific integrated circuit ("ASIC"), a state machine, or other suitable processing device. The processing device 902 can include any number of processing devices, including one. The processing device 902 can be communicatively coupled to computer-readable media, such as memory device 904. The processing device 902 can execute computer-executable program instructions and/or access information respectively stored in the memory device 904. In some implementations, the processor 902 and memory 904 may be incorporated as components of a microcontroller, such as the microcontroller 211,511.

The memory device 904 can store instructions that, when executed by the processing device 902, cause the processing device 902 to perform operations described herein. The memory device 904 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, flash memory, memory chip(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The computing device 901 can also include a bus 906 that can communicatively couple one or more components of the computing device 901. Although the processor 902, the memory 904, the bus 906, the pulse sensor 209,509, and other components are depicted in FIG. 9 as separate components in communication with one another, other implementations are possible. For example, the processor 902, the memory 904, the bus 906, and the pulse sensor 209,509 can be components of printed circuit boards or other suitable devices that can be disposed in a computing device 901 to store and execute programming code.

The computing device 901 can also include a network interface device 908, such as may be implemented by a radio. The network interface device 908 can be a transceiving device configured to establish one or more of the wireless communication links via an antenna 911. A non-limiting example of the network interface device 908 is an RF transceiver and can include one or more components for establishing a communication links to other computing devices in a mesh network, such as specified by IEEE 802.15.4, Wi-SUN, and/or other possible network standards.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A computing device, comprising:
a processor;
one or more sensors for detecting electrical pulses received from a data line;
a radio for communicating on a network accessible to the computing device; and
a memory configured by an application executed in the computing device, the application comprising logic causing the computing device to;
receive, via the data line attached to the one or more sensors of the computing device, a first pulse from a utility meter, wherein the first pulse is received on a first one of two inputs;
in response to receiving the first pulse on the first input, increment a first counter corresponding to the first input, wherein a second counter corresponds to the second one of the inputs;
receive, via the data line attached to the one or more sensors of the computing device, a second pulse from the utility meter, wherein the second pulse is received on either the first input or the second input;
when the second pulse is received on the first input:
increment the first counter corresponding to the first input;
determine, based on receiving the first pulse and the second pulse at the first input, that the utility meter attached to the computing device uses a first type of switch; and
increment a consumption counter to record that two units have been consumed, wherein the utility meter with the first type of switch indicates one unit consumed for each pulse sent; and
when the second pulse is received on the second input:
increment the second counter corresponding to the second input;
determine, based on receiving the first pulse at the first input and the second pulse at the second input, that the utility meter attached to the computing device uses a second type of switch; and
increment the consumption counter to record that one unit has been consumed, wherein the utility meter with the second type of switch indicates one unit consumed by sending one pulse on each of the first input and the second input.

2. The computing device of claim 1, further comprising logic causing the computing device to transmit a value of the consumption counter to an administrative server accessible via a network.

3. The computing device of claim 1, wherein the computing device is part of a mesh network comprising other computing devices attached to utility meters.

4. The computing device of claim 1, further comprising logic causing the computing device to distinguish voltage changes on the data line representing a pulse from electrical noise that should not represent a pulse.

5. The computing device of claim 1, further comprising logic causing the computing device to clear a detection flag once the type of utility meter is determined.

6. The computing device of claim 1, further comprising logic causing the computing device to receive a directive from an administrative server specifying the type of utility meter attached to the computing device.

7. A method for detecting a type of utility meter that is removably attached to a computing device via a data line, the method comprising:
  receiving, via the data line attached to the computing device, a first pulse from a utility meter, wherein the first pulse is received on a first one of two inputs;
  in response to receiving the first pulse on the first input, incrementing, in the computing device, a first counter corresponding to the first input, wherein a second counter corresponds to the second one of the inputs;
  receiving, via the data line attached to the computing device, a second pulse from the utility meter, wherein the second pulse is received on either the first input or the second input;
  when the second pulse is received on the first input:
    incrementing, in the computing device, the first counter corresponding to the first input;
    determining, in the computing device, that the utility meter attached to the computing device uses a first type of switch based on receiving the first pulse and the second pulse at the first input; and
    incrementing, in the computing device, a consumption counter to record that two units have been consumed, wherein the utility meter with the first type of switch indicates one unit consumed for each pulse sent; and
  when the second pulse is received on the second input:
    incrementing, in the computing device, the second counter corresponding to the second input;
    determining, in the computing device, that the utility meter attached to the computing device uses a second type of switch based on receiving the first pulse at the first input and the second pulse at the second input; and
    incrementing, in the computing device, the consumption counter to record that one unit has been consumed, wherein the utility meter with the second type of switch indicates one unit consumed by sending one pulse on each of the first input and the second input.

8. The method of claim 7, further comprising transmitting, by the computing device, a value of the consumption counter to an administrative server accessible via a network.

9. The method of claim 7, wherein the computing device is part of a mesh network comprising other computing devices attached to utility meters.

10. The method of claim 7, further comprising distinguishing, in the computing device, voltage changes on the data line representing a pulse from electrical noise that should not represent a pulse.

11. The method of claim 10, further comprising identifying, in the computing device, whether the utility meter sends the pulses using a mechanical switch or a transistor based on the electrical noise.

12. The method of claim 7, further comprising clearing, in the computing device, a detection flag once the type of utility meter is determined.

13. The method of claim 7, further comprising receiving, in the computing device, a directive from an administrative server specifying the type of utility meter attached to the computing device.

14. The method of claim 13, further comprising storing, in the computing device, an exception when the type of utility meter specified in the directive differs from the type of utility meter determined by the computing device.

15. The method of claim 7, wherein the first type of switch is a Form A-type switch and the second type of switch is a Form C-type switch.

16. A non-transitory computer-readable medium embodying a program executable by a processor of a computing device, comprising code for:
  receiving, via a data line attached to the computing device, a first pulse from a utility meter, wherein the first pulse is received on a first one of two inputs;
  in response to receiving the first pulse on the first input, incrementing a first counter corresponding to the first input, wherein a second counter corresponds to the second one of the inputs;
  receiving, via the data line attached to the computing device, a second pulse from the utility meter, wherein the second pulse is received on either the first input or the second input;
  when the second pulse is received on the first input:
    incrementing the first counter corresponding to the first input;
    determining, based on receiving the first pulse and the second pulse at the first input, that the utility meter attached to the computing device uses a first type of switch; and
    incrementing a consumption counter to record that two units have been consumed, wherein the utility meter with the first type of switch indicates one unit consumed for each pulse sent; and
  when the second pulse is received on the second input:
    incrementing the second counter corresponding to the second input;
    determining, based on receiving the first pulse at the first input and the second pulse at the second input, that the utility meter attached to the computing device uses a second type of switch; and
    incrementing the consumption counter to record that one unit has been consumed, wherein the utility meter with the second type of switch indicates one unit consumed by sending one pulse on each of the first input and the second input.

17. The non-transitory computer-readable medium of claim 16, wherein the computing device is part of a mesh network comprising other computing devices attached to utility meters.

18. The non-transitory computer-readable medium of claim 16, further comprising code for transmitting a value of the consumption counter to an administrative server accessible via a network.

19. The non-transitory computer-readable medium of claim 16, further comprising code for distinguishing voltage changes on the data line representing a pulse from electrical noise that should not represent a pulse.

20. The non-transitory computer-readable medium of claim 16, wherein the first type of switch is a Form A-type switch and the second type of switch is a Form C-type switch.

* * * * *